April 21, 1931.   C. G. MIKKELSEN   1,801,679
ROTARY EGG HOLDER FOR INCUBATORS
Filed Feb. 13, 1928   2 Sheets-Sheet 1
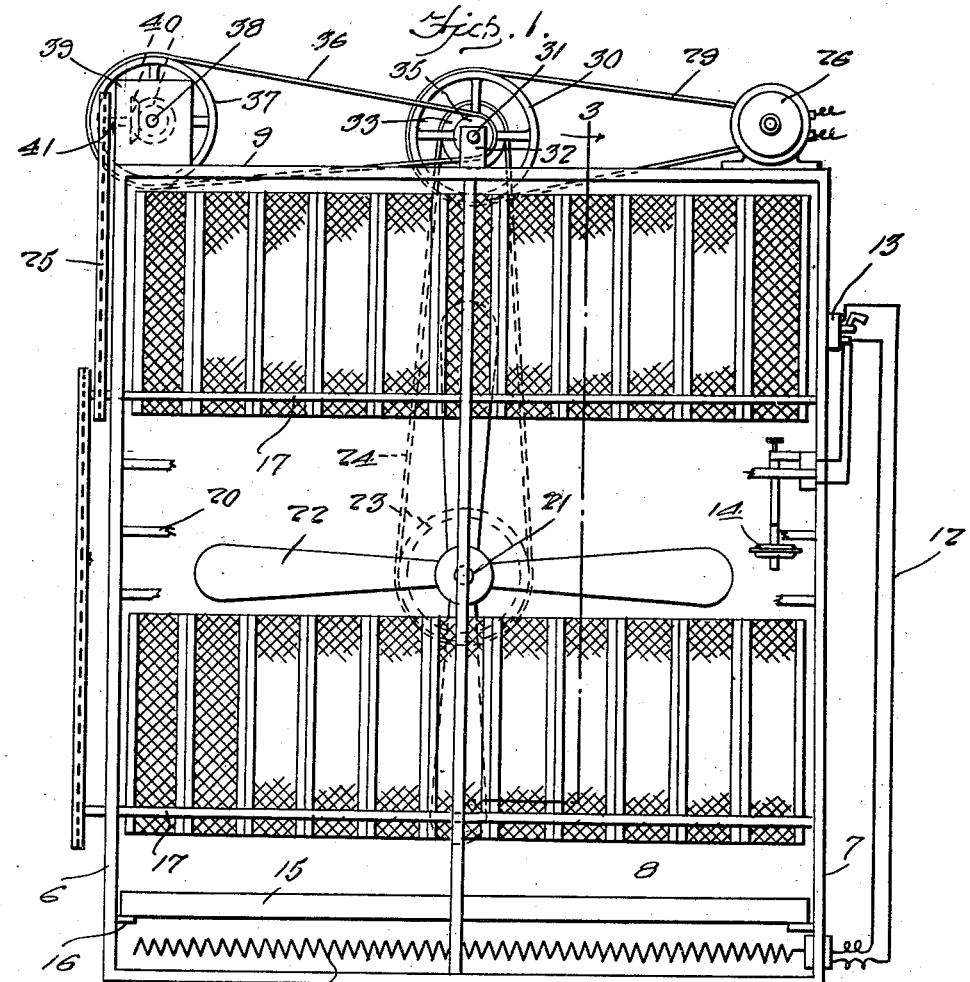
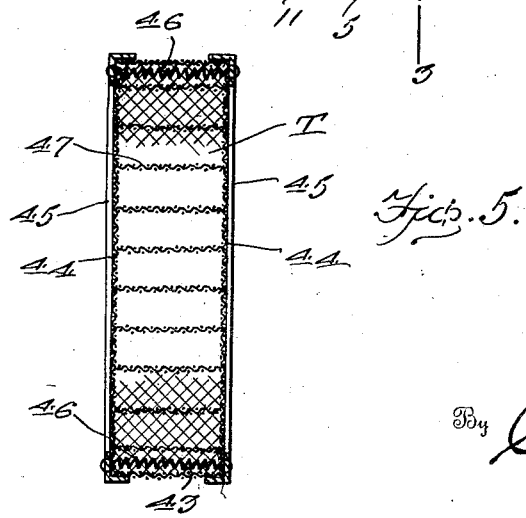
Inventor
C. G. Mikkelsen
By Clarence A. O'Brien
Attorney

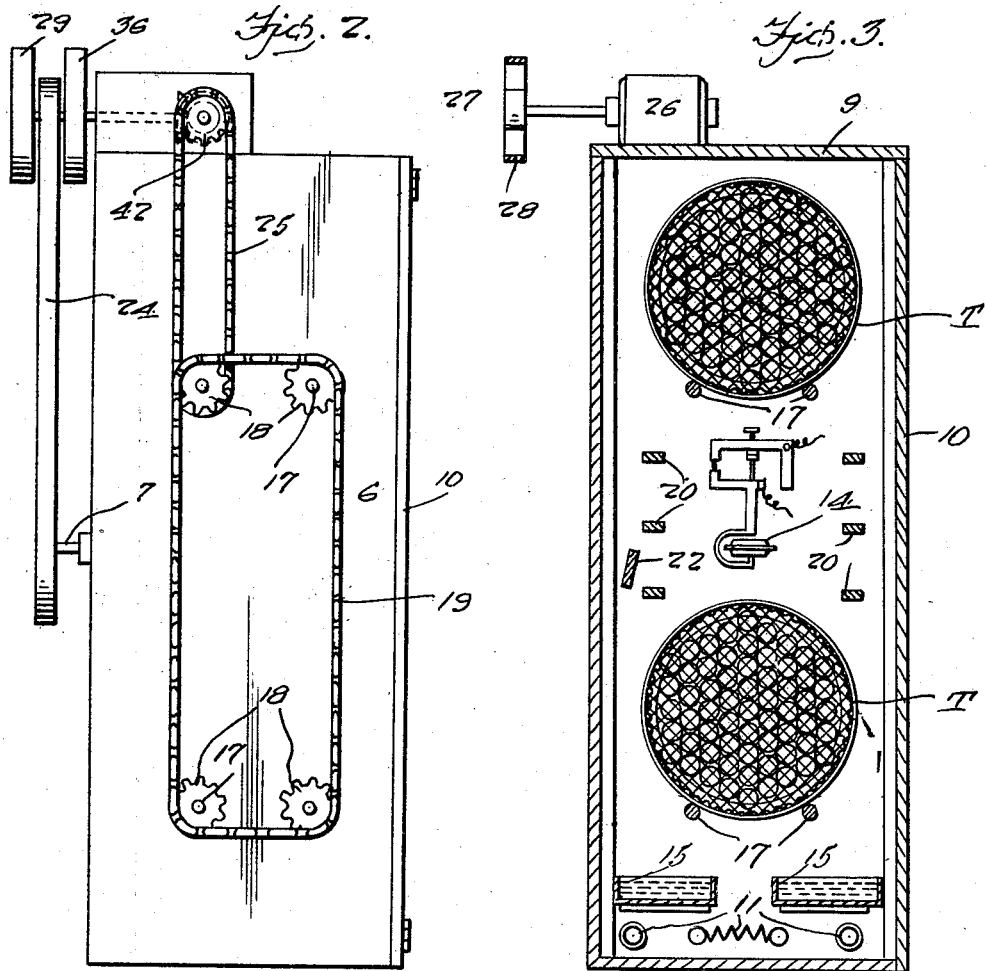
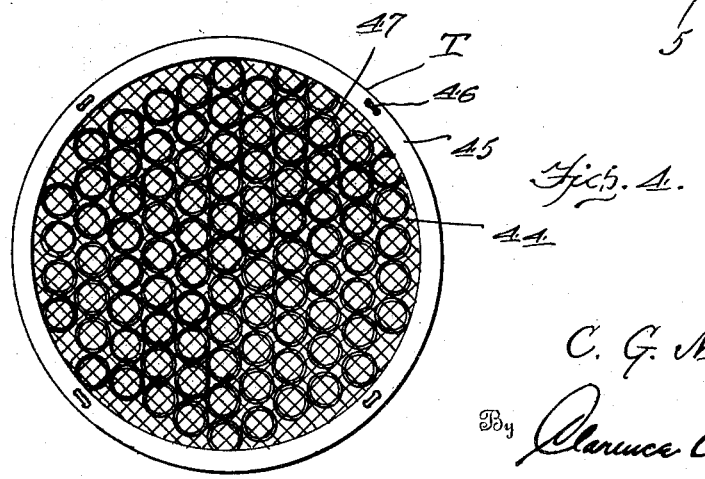

Patented Apr. 21, 1931

1,801,679

UNITED STATES PATENT OFFICE

CARL G. MIKKELSEN, OF HILLIARD, FLORIDA

ROTARY EGG HOLDER FOR INCUBATORS

Application filed February 13, 1928. Serial No. 254,004.

The present invention relates to an incubator and has for its prime object to provide means for continuously moving the eggs in the incubator for changing their position thus encouraging and aiding the growth of the embryos by simulating nature as it is well known that the hen changes the position of her eggs continuously. The slight jarring caused by the movement of the eggs is also beneficial in crystalizing the shells thereby making it easier for the chicks to break through the shell at hatching time.

A further very important object of the invention resides in the provision of an incubator in which may be disposed a plurality of egg trays so that said trays will be continuously rotated for changing the position of the eggs therein.

Another object of the invention resides in the provision of a novel tray for holding the eggs therein and preventing the breaking of the eggs while in motion.

A still further very important object of the invention resides in the provision of a rotary egg holder or incubators of this nature which is simple in its construction, inexpensive to manufacture and operate, durable, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a front elevation of the incubator embodying the feaures of my invention showing the door removed.

Figure 2 is an end elevation thereof,

Figure 3 is a vertical transverse section taken substantially on the line 3—3 of Figure 1, Figure 4 is a side elevation of one of the egg trays, and Figure 5 is a sectional view therethrough.

Referring to the drawing in detail it will be seen that the casing disclosed herein merely by way of preference comprises a bottom 5, end walls 6 and 7, a rear wall 8 and a top wall 9. The walls 6 and 7 rise from the ends of the bottom 5 and the rear wall 8 rises from one longitudinal edge thereof and is connected with the rear longitudinal edges of the ends of the walls 6 and 7 in any preferred manner. The top wall 9 is secured to the upper edges of the walls 6 and 8 in any preferred manner. These walls at the bottom may be of an integral construction if so desired. The door 10 is hingedly mounted on one of the end walls to be closable over the front of the casing. The door 10, of course, may be mounted in any other suitable manner. The shape and details of this casing are not of the essence of the invention. A suitable number of electric heating coils 11 are mounted in the bottom portion of the casing and are in circuit by a suitable wiring 12 with a relay coil 13 and a thermostat 14. The thermostat is preferably located on the inner side of the wall 7 while the relay 13 is preferably located on the outer side thereof. Moistening trays 15 are mounted above the heating coils 11 and may be rested on brackets 16 extending inwardly from the end walls 6 and 7  In the present instance I have shown two of these trays with sufficient space therebetween to permit full circulation of air. Two pair of shafts 17 are journalled in the end walls 6 and 7 and extend to the outer side of the wall 6 and on said outer ends are mounted sprockets 18 over which is trained an endless chain 19 so that the four shafts 17 rotate in unison. One pair of the shafts 17 is located in the bottom portion of the casing a little above the trays 15 while the other pair of shafts is located above said center horizontal plane of the casing and below the top wall 9 thereof. The shafts 17 of each pair are in the same horizontal plane and are disposed in spaced parallelism to each other. The number of these shafts and their particular locations in the casing are matters of preference, it being essential, however, that the shafts be arranged at least in pairs in substantially the same horizontal plane. It is quite obvious that other shafts could be used with each pair and that the shafts of the pairs could be located in slightly spaced horizontal planes without departing from the essence of the invention. It is by far, however, preferable to dispose the shaft as described and illustrated in the preferred embodiment of the invention disclosed herein.

Rods 20 extend between the end walls 6 and 7 so as to form a plurality of shelves for supporting hatching trays. In the present example of the invention these rods are arranged in a plurality of horizontal planes, a pair in each plane and are disposed below the upper pair of shafts 17 and above egg trays to be hereinafter referred to on the lower pair of shafts 17. A shaft 21 is journaled through the rear wall 8 preferably at the center thereof and on the inner end thereof has a fan 22 and on the outer end is provided with a pulley 23 over which is trained a belt 24. One of the upper pairs of shafts 17 has mounted on its outer end portion a sprocket over which is trained a chain 25. An electric motor 26 is mounted on the top wall 9 and the armature pulley 27 thereof has a belt 28 trained thereover and also trained over a pulley 30 fixed to a shaft 31 journalled in brackets 32 on the top 9. A pulley 33 is affixed to the shaft 31 and has trained thereover the belt 24. A pulley 35 is fixed to the shaft 31 and has trained thereover a belt 36 which is also trained over the pulley 37 on a shaft 38 journaled in a gear housing 39 on the top 9.

Beveled gears 40 operatively connect the shaft 38 with a shaft 31 journaled in the housing 39 and on which is mounted a sprocket 42 over which is trained a chain 25. Therefore when the motor 26 is in operation the fan rotates and the shaft 17 rotates. The gearing described in detail above is proportioned in a ratio so that the fan 22 revolves at a much greater rate of speed than the shaft 17. This source of power and the gearing incident thereto for operating the fan and the shaft have been disclosed merely for exemplification and are not of the essence of invention.

A plurality of cylindrical egg trays T are supported on the shafts 17. The diameters of the trays are greater than the distance between the shafts of each pair so that the trays may be supported as is indicated to advantage in Figures 1 and 3 and thus it will be seen that as the shafts 17 rotate said trays will rotate.

Each tray T comprises a cylindrical wall 43, end walls 44 in the form of disks, angle iron rings 45 and springs 46. The walls 43 and 44 are formed of foraminous material preferably wire mesh. The edges of these walls are arranged in the angle iron rings 45 and the springs 46 are engaged with the rings tending to draw them together so as to hold the walls assembled. A plurality of cylindrical egg containers 47 are disposed within the trays T having their axes disposed in parallelism with the axes of the tray. These egg holders are grouped as indicated to advantage in Figure 4. The holders 47 are preferably in the form of cylinders and constructed of foraminous material such as mesh wire.

The eggs are first placed in the holders 47 and then by moving one of the rings 45 away from the other one of the end walls 44 may be easily removed so that the holders may be placed in the tray and then the end wall and ring are replaced and all of the parts are securely held in assembled relationship by the springs 46. These trays are of my own invention but it is apparent that trays of other constructions may be utilized without departing from the essential combination of elements for supporting the tray and imparting rotation thereto.

When the parts are in operation it will be seen that the eggs are constantly changing their position and that the fan is actuating the air so as to maintain an even temperature throughout the casing and further functionally cooperate with the water in trays 15 to evaporate said water along with the heat generated by the coils 11 so as to have a proper moisture in the air to produce maximum efficiency. When hatching time comes the eggs are removed from the trays T and placed in suitable trays (not shown) supported on the shelves formed by the bars 20.

It is thought that the construction, operation, utility and advantages of the invention will now be quite apparent to those skilled in this are without a more detailed description thereof.

The present embodiment of the invention has been disclosed merely for the purposes of exemplification and the particular embodiment has proven in actual practice to be thoroughly efficient.

It is apparent, however, that changes in the details of construction, in the sizes and proportions thereof, and in the combination and arrangement of parts may be resorted to without departing from the spirit or scope of the invention as hereinafter claimed or sacrificing any of its advantages.

Having thus described my invention, what I claim as new is:

1. An egg tray for an incubator of the class described comprising a cylindrical foraminous wall, a pair of disk end walls, a pair of rings for receiving the edges of the walls, and springs engaged with the rings urging them toward each other to hold the walls assembled.

2. An egg tray for an incubator of the class described comprising a cylindrical foraminous wall, a pair of disk end walls, a pair of rings for receiving the edges of the walls, and springs engaged with the rings urging them toward each other to hold the walls assembled, and a plurality of egg holders in the tray each comprising a foraminous cylinder.

3. An incubator comprising in combination a pair of spaced parallel shafts, means for rotatably supporting the shafts, a foraminous cylinder of greater diameter than the distance between said shafts supported on said shafts and including a cylindrical wall, a pair of end walls, spring pressed rings receiving the edges of the walls for normally retaining the walls in assembled relationship, means for supporting eggs within said cylinder, and means for rotating said shafts for transmitting rotary motion to said cylinder.

In testimony whereof I affix my signature.

CARL G. MIKKELSEN.